United States Patent [19]

Ueda et al.

[11] 3,821,559

[45] June 28, 1974

[54] CONTROL SYSTEM FOR ELECTRIC INSTALLATIONS

[75] Inventors: Atsushi Ueda; Mitsuaki Ishii, both of Himeji, Japan

[73] Assignee: Mitsubishi Denki Kabushiki Kaisha, Tokyo, Japan

[22] Filed: Jan. 2, 1973

[21] Appl. No.: 320,628

[52] U.S. Cl. .................................. 307/10 R, 307/40

[51] Int. Cl. .................................................. H02g 3/00

[58] Field of Search .............. 307/10 R, 27, 40, 115, 307/129, 134; 340/171 R, 171 PF, 171 A, 63, 64, 52 F; 317/134

[56] References Cited

UNITED STATES PATENTS

| | | | |
|---|---|---|---|
| 3,480,769 | 11/1969 | Gilbert | 340/171 |
| 3,651,454 | 3/1972 | Venema et al. | 307/10 R |

*Primary Examiner*—Robert K. Schaefer
*Assistant Examiner*—M. Ginsburg
*Attorney, Agent, or Firm*—Robert E. Burns; Emmanuel J. Lobato; Bruce L. Adams

[57] ABSTRACT

In the disclosed system a 3-bit binary coded signal having eight words each corresponding to one of eight switches and control signals corresponding to those switches in their "ON" and developed in response to the binary coded signals are represented by amplitude varying currents wherein different frequencies correspond to different bits of the binary coded signal. The binary coded signals and the control signals are delivered via a single transmission line to eight receivers connected to respective electric devices. In each receiver the signals are restored to their original forms and a binary coded signal corresponding to an associated switch is decoded and applied along with the control signal resulting from that switch, being closed, to a driving circuit for enabling an associated electric device. Only those binary coded signals assigned to closed switches are delivered to the receivers.

10 Claims, 3 Drawing Figures

CONTROL SYSTEM FOR ELECTRIC INSTALLATIONS

BACKGROUND OF THE INVENTION

This invention relates to a control system for controlling electric installations, and more particularly to a control system for controlling a plurality of electric installations equipped on a vehicle or the like through the use of a single length of control wire.

Electric installations equipped on the vehicles or the like involve those controlled at will by its operator or driver, for example, the headlight, wiper, etc. indicators such as ammeter, and controls such as regulators. In view of the standpoint of security, public nuisances, etc., there is recently a tendency to increase the number and types of electric installations equipped on the vehicles. This has led to an increasingly complicated circuit configuration of electric wire required for connections to those many electric installations and therefore to an increase in costs of manufacturing and installing them. Furthermore, it has been very difficult to check and repair the electric installations upon their failures.

SUMMARY OF THE INVENTION

Accordingly it is a general object of the present invention to eliminate the disadvantages of the prior art practice as above described.

It is another object of the present invention to provide a new and improved control system for controlling a plurality of electric installations equipped on a vehicle or the like with a simplified circuit configuration of wiring required for the electric installations.

The present invention accomplishes these objects by the provision of a control system for controlling a plurality of electric installations including a transmitter unit including a plurality of control switches, one for each of the electric installations, and a plurality of receiver units connected via a single transmission line to the transmitter unit and also connected to the respective electric installation. In the transmitter unit, a plurality of multiple-bit binary coded signals assigned to the respective control switches are sequentially and repeatedly generated while control signals resulting from the control switches in their "ON" position are produced in response to the binary coded signals. The plural bits of the binary coded signal and the control signal are converted to predetermined fixed frequencies different from one another. The binary coded and control signals thus converted are delivered through the single transmission line to the receiver units. In each of the receiver units the converted signals are restored to their original respective form and that binary coded signal assigned to the associated electric installation is decoded. The decoded signal picks up the control signal for that electric installation connected to each of the receiver unit to permit the electric installation to be put in operation. With the associated control switch put in its "OFF" position, the control signal originating therefrom is absent.

The control system as above outlined can be simplified by delivering to the receiver units only those binary coded signals in the form of frequencies assigned to the control switches in their "ON" position.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
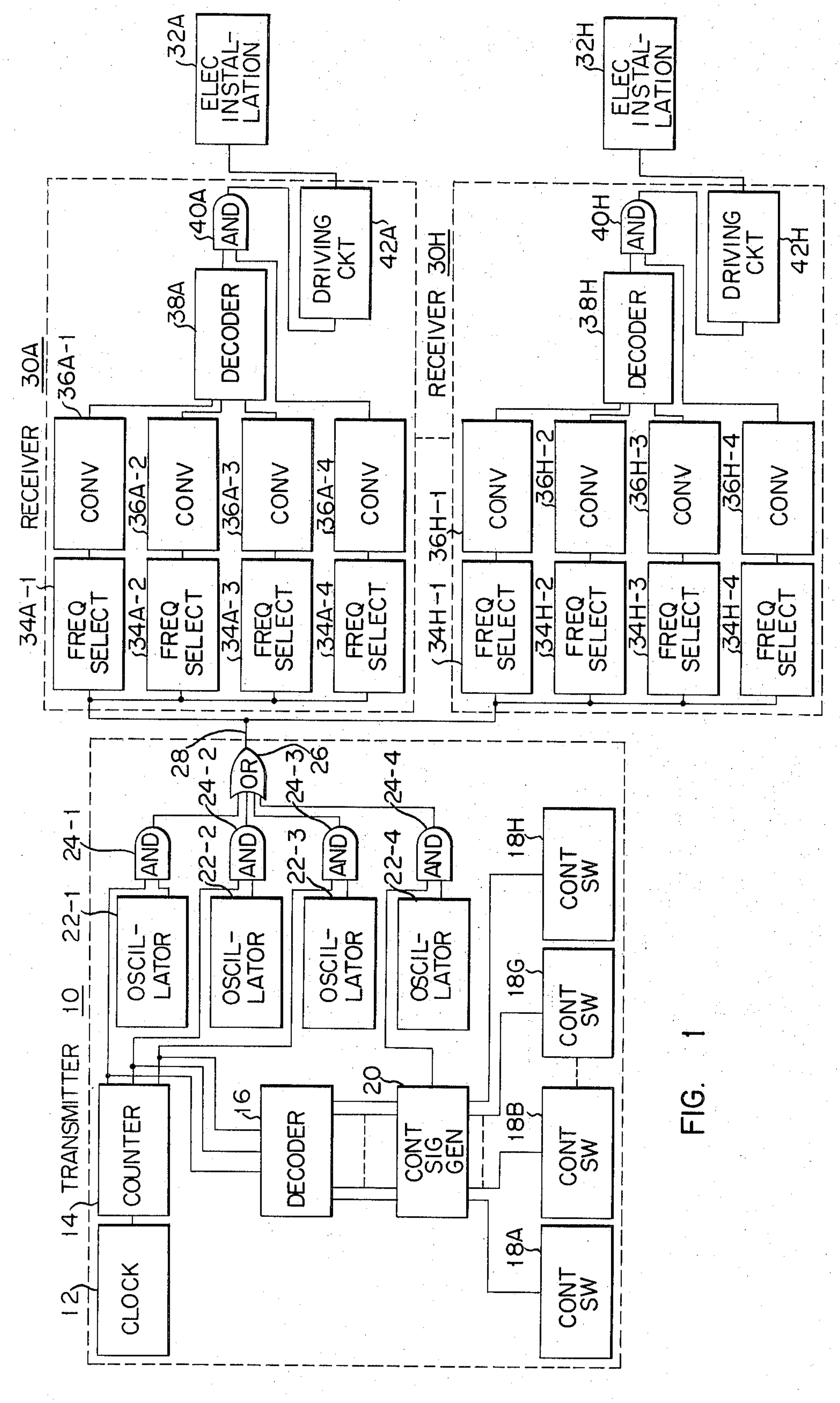
FIG. 1 is a block diagram of a control system for electric installations constructed in accordance with the principles of the present invention.

Referring now to the drawings and FIG. 1 in particular, there is illustrated a control system constructed in accordance with the principles of the present invention in which binary coded signals including three bits represented by alternating current having different frequencies are utilized to simultaneously transmit control signals from eight control switches to respective electric installations equipped on a vehicle or the like through a single transmission line. However it is to be understood that the present invention is not restricted thereto or thereby and that it is equally applicable to $n$-bit binary coded signals where $n$ is any interger greater than three. In the latter event, $2^n$ control signals may be simultaneously transmitted to the side of electric installations and therefore the present system can control at most $2^n$ of the electric installations.

The arrangement illustrated comprises a transmitter unit generally designated by the reference numeral 10 including a reference time generator or a clock 12 for producing a train of clock pulses, a counter 14 for counting the clock pulses from the clock 12 to provide counts in the form of three bits, and a decoder 16 connected to the counter 14 through a plurality of leads, in this case three leads one for each bit. The transmitter unit 10 also comprises a plurality, in the example illustrated eight, of control switches 18A, 18B, ..., 18G 18H connected to a control signal generator circuit 20 subsequently connected to the decoder 16 through a plurality, in the example illustrated, eight of leads one for each switch.

The transmitter unit 10 further comprises a plurality, in this case, four of oscillators 22-1, 22-2, 22-3 and 22-4 connected respectively to one input of "AND" circuits 24-1, 24-2, 24-3 and 24-4. The "AND" circuits 24-1, 24-2, and 24-3 have the other inputs connected to the counter 14 while the "AND" circuit 24-4 has the other input connected to the control signal generator circuit 20. Then all the "AND" circuits 24-1, 24-2, 24-3, and 24-4 are connected at the outputs to an "OR" circuit 26 having an output connected via a single transmission line 28 to a plurality of receiver units 30A, 30B,..., 30H.

The receiver unit 30A, ..., 30H are provided one for each control switch 18A, 18B, ... or 18H and connected to a different one of a plurality of, in this case eight, electric installations 32A, ..., 32H. All the receiver units 30A, ..., 30H are substantially identical in construction to one another and only one, for example, the receiver unit 30A will now be described in detail. The receiver unit 30A includes four frequency selectors 34A-1, 34A-2, 34A-3 and 34A-4 one for each oscillator 22-1, 22-2, 22-3 or 22-4 connected at the input to the transmission line 28 and at the output to respective converters 36A-1, 36A-2, 36A-3 and 36A-4. Then the converters 36A-1, 36A-2 and 36A-3 are connected to a decoder 38A subsequently connected to an "AND" circuit 40A at one input. The "AND" 40A has the other input connected to the converter 36A-4 and an output connected to the electric installation 32A through a driving circuit 42A.

Each of the other receiver units 30B, ..., 30H includes the components corresponding to those included in the receiver unit 30A and designated by the like reference numerals denoting the latter components with the suffixed reference character identifying the associated receiver unit. For example, 36H-2 designates the converter included in the receiver unit 30H.

Figure 2:
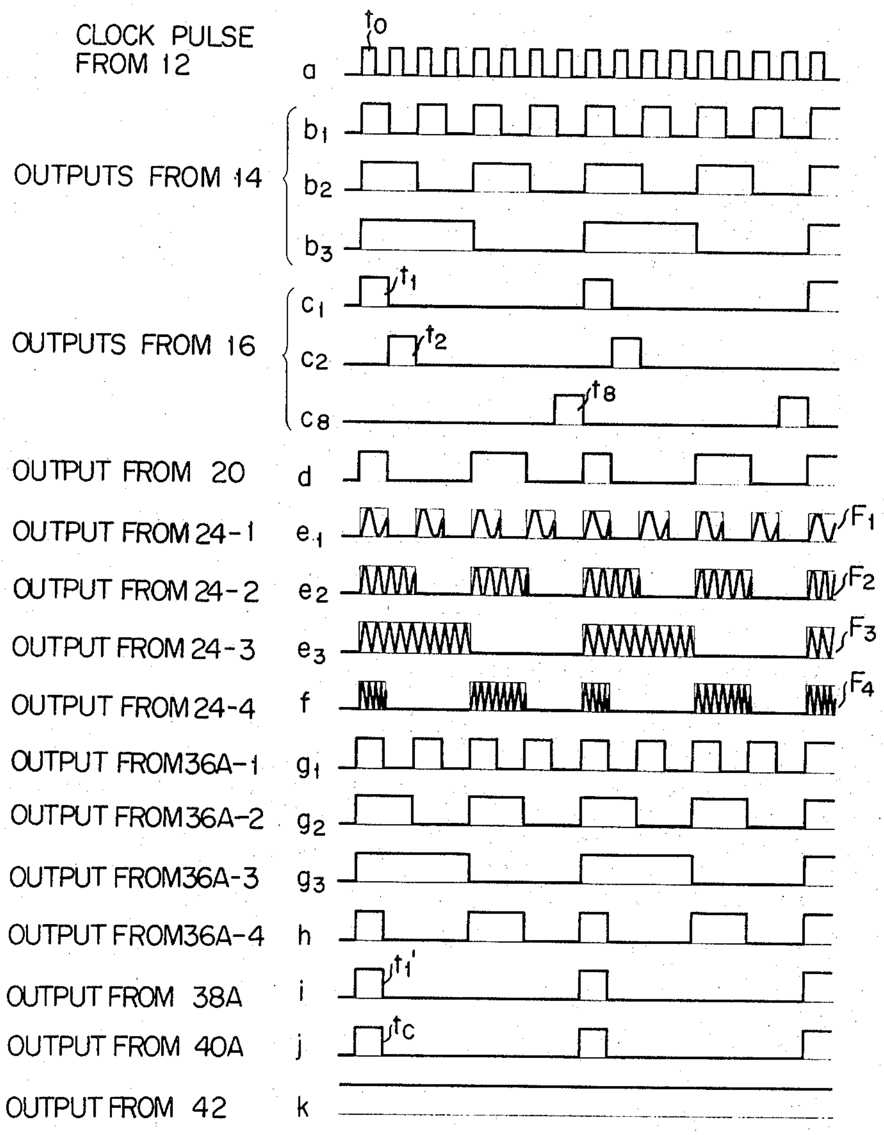
FIG. 2 is a graph illustrating waveforms developed at various points in the arrangement shown in FIG. 1.

The operation of the arrangement as above described will now be described with reference to FIG. 2. The clock 12 produces a train of clock pulses $t_o$ as shown at waveform a in FIG. 2. The counter 14 counts the clock pulses $t_o$ to successively provide three-bit binary coded signals as shown at waveforms $b_1$, $b_2$ and $b_3$ in FIG. 2. Each time the counter 14 counts eight clock pulses it is clear and repeats the counting process. The three-bit binary coded signals are supplied to the decoder 16 where they are decoded to provide sampling pulses $t_1, t_2, ..., t_8$ assigned to the control switches 18A, 18B, ..., 18H and therefore to the electric installations 32A, ..., 32H respectively. FIG. 2 shows, by way of example, waveforms $c_1$, $c_2$ and $c_8$ for the sampling pulses $t_1$, $t_2$ and $t_8$.

The signal generator circuit 20 responds to the sampling pulses $t_1, t_2, ..., t_8$ to pick up the status of the control switches 18A, 18B, ..., 18H. That is, the generator 20 is operative to generate control pulses in response to the status of the control switches 18A...18H when the sampling pulses $t_1, t_2, ..., t_8$ have been produced. As an example, FIG. 2*d* shows an output waveform provided by the control generator 20 illustrating that the control switches 18A, 18E and 18F are in their ON position and the remaining switches 18B, 18C, 18D, 18G and 18H are in their "OFF" position. Since the control switch 18A is in its "ON" position, each train of control pulses included in the waveform *d* has a first control pulse coinciding with the sampling pulse $t_1$ for the switch 18A. If the control switch 18A is in its "OFF" position, that first pulse will not appear. Similarly, only when in their "ON" position, the remaining control switches 18B, ..., 18H enable the control generator circuit 20 to generate the corresponding control pulses simultaneously with the occurrence of the mating sampling pulses $t_2, ..., t_8$. Otherwise the control generator 20 does not generate control pulses in response to the corresponding sampling pulses.

The counter 14 also successively supplies the three-bit binary coded signals to the "AND" circuits 24-1, 24-2 and 24-3. That is, three bits of each of the coded signals are supplied in parallel to the "AND" circuits 24-1, 24-2 and 24-3 at one input. Further the control generator 20 applies the control signal to the "AND" circuit 24-4. All the four "AND" circuits 24-1, 24-2, 24-3 and 24-4 have the other inputs to which the oscillator 22-1, 22-2, 22-3 and 22-4 continuously apply sinusoidal signals having predetermined fixed frequencies $F_1$, $F_2$, $F_3$ and $F_4$ respectively. Thus the "AND" circuits 24-1, 24-2, 24-3 and 24-4 provide at their outputs the sinusoidal signals from the oscillators 22-1, 22-2, 22-3 and 22-4 having superposed thereon suitable direct currents respectively only during the application of the outputs from the counter and generator 14 and 20 respectively the same. Those signals are shown at waveforms $e_1$, $e_2$, $e_3$ and *f* in FIG. 2. In the example illustrated, the frequency $F_4$ from the control generator circuit 20 and therefore from the "AND" circuit 24-4 is assumed to be the highest while the frequency $F_1$ is the lowest with the frequencies $F_2$ and $F_3$ higher and lower than the frequencies $F_1$ and $F_4$ respectively.

The outputs from the "AND" circuits 24-1, 24-2, 24-3 and 24-4 are supplied to the "OR" circuit 26 where the outputs are combined into a hybrid time and frequency division type signal including the three-bit binary coded signals from the counter 14 each have three bits represented by the different frequencies $F_1$, $F_2$ and $F_3$ respectively, and the control signals have the frequency $F_4$. The signal from the "OR" circuit 26 is delivered through the single transmission line 28 to the receiver units 30A, ..., 30H.

The receiver units 30A, ..., 30H are substantially identical in operation to one another excepting that the decoder included in each receiver unit is adapted to decode only that three-bit binary coded signal assigned to that receiver unit and therefore to the associated electric installation. Therefore one of the receiver units, for example, the unit 30A will now be described.

The frequency selectors 34A-1, 34A-2, 34A-3 and 34A-4 are operated to select the respective frequencies $F_1$, $F_2$, $F_3$ and $F_4$ provided by the oscillators 22-1, 22-2, 22-3 and 22-4 from the time and frequency division type signal on the transmission line 28. The converters 36A-1, 36A-2, 36A-3 and 36A-4 respond to the frequency outputs from the frequency selectors 34A-1, 34A-2, 34A-3 and 34A-4 to produce respective outputs as shown at waveforms $g_1$, $g_2$, $g_3$ and *h* only for the durations of the output frequencies. That is, the converters 36A-1, 36A-2 and 36A-3 restore pulses forming the three-bit binary coded signals $b_1$–$b_2$–$b_3$ initially provided by the counter 14 while the converter 36A-4 restores the signals representing those control switches put in their "ON" position.

The pulses from the converters 36A-1, 36A-2 and 36A-3 are applied to the decoder 38-A. The decoder 38-A responds to that set of pulses forming the three-bit binary coded signal assigned to the control switch 18A and therefore to the electric installations 32A to provide a pulse $t'_1$ as shown at waveform *i* in FIG. 2, identical to the sampling pulse $t_1$ from the decoder 16. The pulse $t'_1$ is applied to the "AND" circuit 40A for determining if the control signal resulting from the control switch 18A is being applied to the "AND" circuit 40A when the pulse $t'_1$ is provided by the decoder 38A. Since the control signal for the electric installation 32A is now being transmitted to the receiver unit 30A due to the closure of the control switch 18A, the converter 36A-4 produces the pulse (see waveform *h* shown in FIG. 2) when the decoder 38A has provided the pulse $t'_1$. Thus "AND" circuit 40A has the pulses applied to both inputs thereto to provide a pulse $t_c$ as shown at waveform j in FIG. 2.

The pulse from the "AND" circuit 40A is supplied to the driving circuit 42A to permit the latter to produce an output as shown at waveform *k* in FIG. 2. Therefore the electric installation 32A connected to the driving circuit 42A is energized from the associated power line (not shown). If the "AND" circuit 40A provides no pulse $t_c$ because of the absence of the control signal for the electric installation 32A, the driving circuit 32A does not produce the output. Thus the electric installation 32A remains deenergized.

The remaining receiver units 30B, ..., 30H are operative in the same manner as above described in conjunction with the receiver unit 30A. However each of the decoder 38B, ..., 38H is operative to decode the coded signal assigned to the associated electric installation 32B, ..., 32H to form a pulse corresponding to the sampling pulse $t_2$, ..., or $t_8$.

In the arrangement as shown in FIG. 1, the control signals representing the status of the contact closure type switches are transmitted to the receiving side on which there are provided means for determining whether the control signal is present or absent. The arrangement of FIG. 1 can be simplified into an arrangement as shown in FIG. 3 wherein the binary coded signals are used to determine if the control signals are present on the transmitting side.

Figure 3:
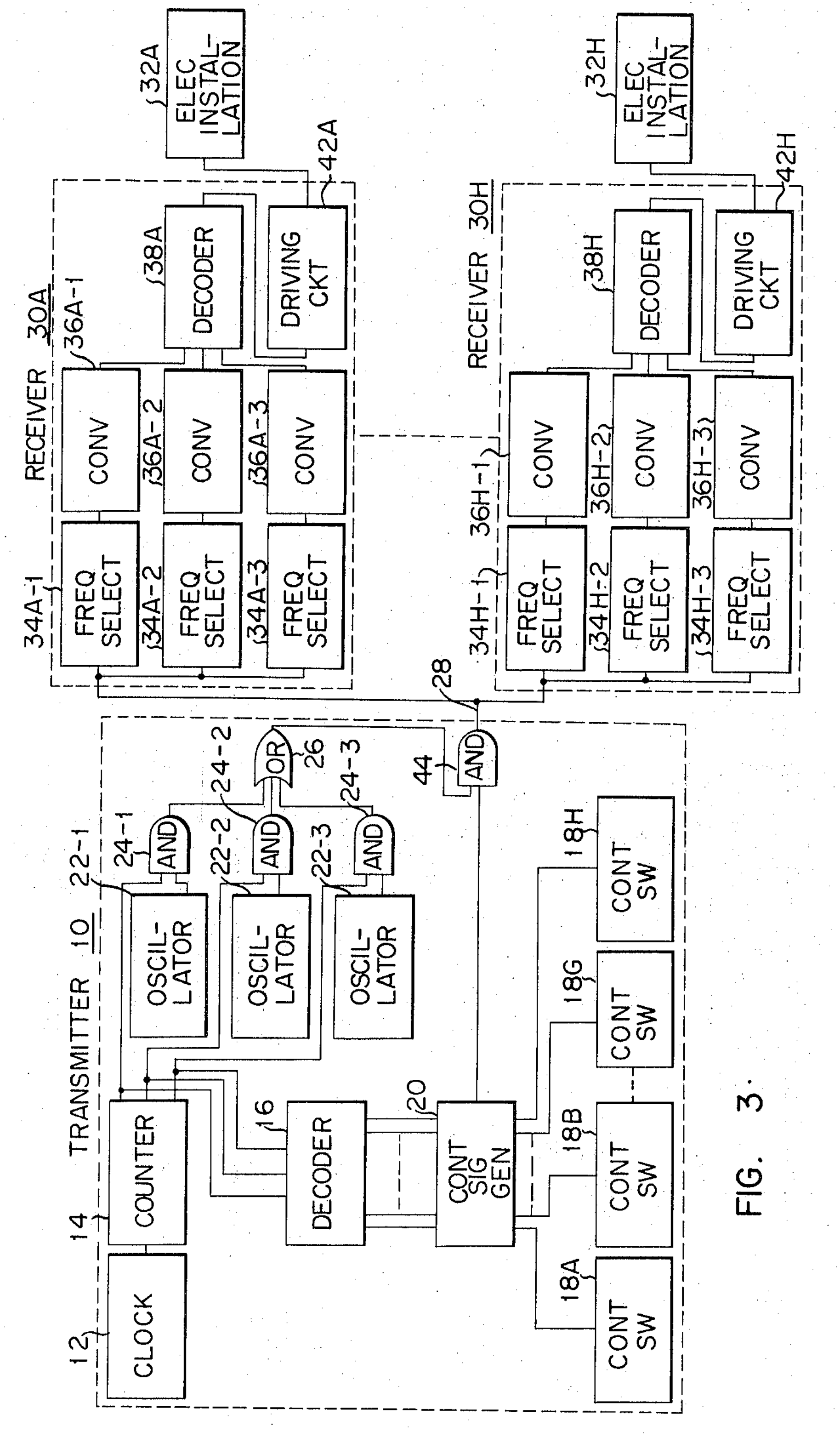
FIG. 3 is a block diagram of a modification of the invention.

In the arrangement as shown in FIG. 3, wherein like reference numerals designate the components identical to those illustrated in FIG. 1, the transmitter unit 10 includes an "AND" circuit 44 having a pair of inputs connected to the outputs of the "OR" and control generator circuits 26 and 20 respectively and an output connected to the transmission line 28 but the "AND" circuit 24-4 and the oscillator 22-4 operatively associated to the control generator circuit 20 are omitted.

In each of the receiver units 30A, ..., 30H, the frequency selector 34-4 for selecting the frequency of the oscillator 22-4 and the associated converters 36-4 as shown in FIG. 1 are now omitted. Also the decoder 38A ... 38H is directly connected to the driving circuit 42A ... 42H with the "AND" circuit 40 omitted.

In other respects, the arrangement is substantially identical to that shown in FIG. 1.

The operation of the arrangement as shown in FIG. 3 will now be briefly described in conjunction with FIG. 2. In the transmitter unit 10, the "AND" circuit 44 has applied to a pair of inputs thereof the outputs from the "OR" and control generator circuits 26 and 20 respectively so that it delivers one output to the transmission line 28 only when the control generator circuit 20 generates each of pulsed control signals corresponding to those control switches 18A ... 18H at their "ON" position such as shown at waveform *d* in FIG. 2. This is because, the counter 14 provides one three-bit binary coded signal assigned to each control switch 18A ... 18A and simultaneously the control generator circuit 20 generates one control signal resulting when that switch is in its "ON" position as already described in conjunction with FIGS. 1 and 2. Thus for each of those control switches in their "ON" position, the "AND" circuit 44 provides one binary coded signal having three bits represented by different frequencies $F_1$, $F_2$ and $F_3$ respectively as shown at waveforms $e_1$, $e_2$ and $e_3$ in FIG. 2. That is, the presence of the binary coded signal indicates that the control switch to which it is assigned is in its "ON" position. On the contrary, if a particular control switch is in its "OFF" position, the "AND" circuit 44 does not provide the corresponding three-bit binary coded signal. In other words, the absence of such a signal indicates that the corresponding control switch is in its "OFF" position.

In the receiver units 30A, ..., 30H, the three-bit binary coded signals are processed in the same manner as above described in conjunction with FIGS. 1 and 2. As above described, for the transmitter unit 10, the presence of a binary code signal indicates that the corresponding control switch 18A ... 18H is in its "ON" position. If the decoder 38A ... 38H in each receiver unit 30A ... 30H provides a pulse such as shown at waveform *i* in FIG. 2, the receiver unit is receiving a control signal for turning the associated electric installation on. The pulse from the decoder 38A ... 38H is directly applied to the corresponding driving circuit 42A ... 42H to permit the associated electric installation 32A ... 32H to be energized as in the arrangement of FIG. 1.

The present invention has several advantages. For example, the connections to the electric installations to be controlled has a very simplified circuit configuration because the binary coded and control signals are composed of amplitude varying current signal having different frequencies and transmitted through a single transmission line to the side of the electric installations. Therefore, the connections are improved in reliability and decreased in manufacturing costs. Also the receiver units are simple in construction and may be substantially identical in contruction to one another resulting in the facilitation of production. Further the system are not affected by frequencies other than those resonant to the frequencies of the oscillators thereby making it insensitive to noise as compared with the transmission of control signals utilizing pulsed signals.

While the invention has been illustrated and described in conjunction with a few preferred embodiments thereof it is to be understood that numerous changes and modifications may be resorted to without departing from the spirit and scope of the invention. For example, *n*-bit binary coded signal where *n* is an integer may be utilized to transmit $2^n$ control signals to control *n* electric installations. Also any desired type of coded signals may be used with the present invention. Further, in the arrangement of FIG. 1 analog signals may be used in place of the control signals provided by the contact closure type of control switches.

What we claim is:

1. A control system for controlling a plurality of electrically powered devices in a vehicle comprising:

a. a transmitter comprising means for developing a periodic first signal sequence of signals corresponding to a periodic sequence of consecutive *n*-bit binary numbers, control circuit means having a plurality of control switches each corresponding to a different *n*-bit binary number and operable to an open and a closed condition, means defining a plurality of signal paths for applying said first signals to said control means for developing control signals in synchronism with the signals in said first signal sequence corresponding to *n*-bit binary numbers for which the corresponding switches are closed, frequency encoding circuit means receptive of the first sequence of signals for providing in response thereto a second signal sequence comprising a periodic sequence of signals corresponding to a periodic sequence of consecutive *n*-bit binary numbers wherein each of the *n*-bits is represented by a different frequency, output circuit means receptive of the second signal sequence and the control signals for providing a transmitter output signal comprising a sequence of superpositions of frequencies representing each of the $n$-bit binary numbers represented by the first signal sequence and corresponding control signals corresponding to a closed state of the corresponding control switches;

b. an output signal path receptive of the transmitter output signal and disposed throughout the vehicle; and c. a plurality of receivers connected to said output signal path wherein each receiver comprises, means responsive to a combination of frequencies corresponding to a specific $n$-bit binary number and the corresponding control signals for providing a signal in response thereto; and means receptive of the last-mentioned signal for enabling a corresponding electrically powered device in response thereto.

2. In a control system for controlling a plurality of electrically powered devices in a vehicle according to claim 1 wherein said means for developing the first signal sequence comprises:

a. a clock circuit for developing a periodic sequence of clock pulses; and b. an $n$-bit counter receptive of the clock pulses for counting the clock pulses and providing the first signal sequence of signals representative of a periodic sequence of consecutive n-bit binary numbers in response thereto.

3. In a control system for controlling a plurality of electrically powered devices in a vehicle according to claim 1 wherein said control means comprises:

a. a decoder receptive of the first signal sequence for providing $2^n$ sampling pulses in response thereto wherein each sampling pulse corresponds to a different $n$-bit binary number and is developed in response to each first signal of the first signal sequence corresponding to that $n$-bit binary number;

b. a control signal generator connected to said control switches and receptive of the sampling pulses for generating a control pulse in response to a sampling pulse corresponding to an $n$-bit binary number for which the corresponding control switch is closed;

c. a control oscillator developing an output signal; and d. an AND gate receptive of the control oscillator output signal and control pulses for gating the control oscillator output signal in response to the control pulses to provide a control signal.

4. In a control system for controlling a plurality of electrically powered devices in a vehicle according to claim 3 wherein said frequency encoding circuit means for providing the second signal sequence comprises:

a. $n$ oscillators each having a different output signal frequency from said control oscillator and from each other; and b. $n$ AND gates each receptive of an output signal from a different one of said n oscillators and a portion of the first signal sequence representative of a different one of the $n$-bits wherein the AND gates gate the oscillator output signals to provide the second signal sequence wherein each of the $n$-bits are represented by a different frequency.

5. In a control system for controlling a plurality of electrically powered devices in a vehicle according to claim 1 wherein said control means comprises:

a. a decoder receptive of the first signal sequence for providding $2^n$ sampling pulses in response thereto wherein each sampling pulse corresponds to a different $n$-bit binary number and is developed in response to each first signal of the first signal sequence corresponding to that $n$-bit binary number; and b. a control signal generator connected to said control switches and receptive of the sampling pulses for generating the control signals in response to the sampling pulses corresponding to the $n$-bit binary numbers for which the corresponding control switches are in a closed state.

6. In a control system for controlling a plurality of electrically powered devices in a vehicle according to claim 11 wherein said output circuit means comprises an OR gate receptive of the second signal sequence from said $n$ AND gates and the control signals for providing the transmitter output signal containing the superposition of the frequencies representing each of the $n$-bit binary numbers represented by the first signal sequence and corresponding control signals.

7. In a control system for controlling a plurality of electrically powered devices in a vehicle according to claim 4 wherein said output circuit means comprises:

a. an OR gate receptive of the second signal sequence from said $n$ AND gates for providing an output signal comprising a superposition of the $n$ AND gate signal frequencies; and b. an AND gate receptive of said OR gate output signal and receptive of the control signals for gating the OR gate output signal in response to the received control signals to provide the transmitter output signal.

8. In a control system for controlling a plurality of electrically powered devices in a vehicle according to claim 1 wherein said means responsive to a combination of frequencies corresponding to a specific $n$-bit binary number and a corresponding control signal comprises:

a. $n$ frequency selectors each receptive of the transmitter output signal and responsive to a different one of the frequencies of the second signal sequence for developing $n$ output signals each comprising a different one of the frequencies of the second signal sequence representative of one of the $n$-bits;

b. $n$ converters each receptive of an output signal from a corresponding one of said $n$ frequency selectors for providing in response thereto output signals corresponding to the first signal sequence;

c. a decoder receptive of the $n$ converter output signals and responsive to a combination of said converter output signals representative of a specific $n$-bit binary number for developing an output signal in response thereto;

d. control signal decoding means receptive of the transmitter output signal for developing output signals in response to the control signals superposed with the transmitter output signal; and e. an AND gate receptive of the decoder output signal and a control signal decoding means output signal for providing an output signal in response to reception of both simultaneously.

9. In a control system for controlling a plurality of electrically powered devices in a vehicle according to claim 1 wherein said means responsive to a combination of frequencies corresponding to a specific *n*-bit binary number and a control signal comprises:

a. *n* frequency selectors each receptive of the transmitter output signal and responsive to a different one of the frequencies of the second signal sequence for developing *n* output signals each comprising a different one of the frequencies of the second signal sequence representative of one of the *n*-bits;

b. *n* converters each receptive of an output signal from a corresponding one of said *n* frequency selectors for providing in response thereto output signals corresponding to the first signal sequence; and c. a decoder receptive of the *n* converter output signals and responsive to a combination of said converter output signals representative of a specific *n*-bit binary number for developing an output signal in response thereto.

10. In a control system for controlling a plurality of electrically powered devices in a vehicle according to claim 1 wherein said output signal path comprises a single conductor.

* * * * *